United States Patent
Shin et al.

(10) Patent No.: US 11,075,395 B2
(45) Date of Patent: Jul. 27, 2021

(54) FUEL CELL MEMBRANE ELECTRODE ASSEMBLY (MEA) WITH HEXAGONAL BORON NITRIDE THIN FILM

(71) Applicant: UNIST (ULSAN NATIONAL INSTITUTE OF SCIENCE AND TECHNOLOGY), Ulsan (KR)

(72) Inventors: Hyeon Suk Shin, Ulsan (KR); Seong In Yoon, Ulsan (KR); Gwangwoo Kim, Ulsan (KR); Tae-Young Kim, Jeollabuk-do (KR); Dong Jun Seo, Jeollabuk-do (KR)

(73) Assignee: UNIST (Ulsan National Institute of Science and Technology), Ulsan (KR)

( * ) Notice: Subject to any disclaimer, the term of this patent is extended or adjusted under 35 U.S.C. 154(b) by 172 days.

(21) Appl. No.: 15/854,177

(22) Filed: Dec. 26, 2017

(65) Prior Publication Data

US 2018/0241059 A1    Aug. 23, 2018

(30) Foreign Application Priority Data

Feb. 23, 2017  (KR) .................. 10-2017-0024327
Feb. 23, 2017  (KR) .................. 10-2017-0024328
Feb. 24, 2017  (KR) .................. 10-2017-0024584

(51) Int. Cl.
*H01M 8/1004*    (2016.01)
*H01M 8/0243*    (2016.01)
(Continued)

(52) U.S. Cl.
CPC ........... *H01M 8/1004* (2013.01); *H01M 4/92* (2013.01); *H01M 4/921* (2013.01); *H01M 4/925* (2013.01);
(Continued)

(58) Field of Classification Search
CPC ............. H01M 8/1004; H01M 8/1018; H01M 8/0271; H01M 4/921; H01M 8/0243;
(Continued)

(56) References Cited

U.S. PATENT DOCUMENTS 8,946,692 B2 *  2/2015  Kelber ................. C23C 16/342
                                                            257/40
2009/0317710 A1 * 12/2009  Douglas .............. H01M 4/0404
                                                            429/163
(Continued)

FOREIGN PATENT DOCUMENTS

JP    2009-026546 A    2/2009
JP    2010-205466 A    9/2010
(Continued)

OTHER PUBLICATIONS

Stuart M. Holmes et al., "2D Crystals Significantly Enhance the Performance of a Working Fuel Cell", Adv. Energy Mater., 2017, pp. 1-7 of 1601216, vol. 7.
(Continued)

*Primary Examiner* — Kwang Han
(74) *Attorney, Agent, or Firm* — Rabin & Berdo, P.C.

(57) ABSTRACT

Disclosed is a fuel cell membrane electrode assembly (MEA) embodiment including an anode layer; at least one exchange membrane that is disposed on the anode layer as either a single-layered structure including one exchange membrane or a multi-layered structure including a plurality of exchange membranes, each exchange membrane of the at least one exchange membrane consisting of a film comprising hexagonal boron, and the at least one exchange membrane having a total thickness ranging from 0.3 to 3 nm; an interfacial binding layer that completely covers an exposed surface of one exchange membrane which is obverse to the anode layer and that consists of poly(methylmethacrylate) (PMMA) as a binder material; and a cathode layer formed on
(Continued)

the interfacial binding layer. Alternately, a fuel cell membrane electrode embodiment may completely eliminate the interfacial binding layer and both embodiments provide superior fuel cell performance.

8 Claims, 12 Drawing Sheets

(51) Int. Cl.
*H01M 8/0271* (2016.01)
*H01M 8/1018* (2016.01)
*H01M 8/1041* (2016.01)
*H01M 8/106* (2016.01)
*H01M 4/92* (2006.01)
*H01M 8/1011* (2016.01)
*H01M 8/04082* (2016.01)

(52) U.S. Cl.
CPC ....... *H01M 8/0243* (2013.01); *H01M 8/0271* (2013.01); *H01M 8/04197* (2016.02); *H01M 8/106* (2013.01); *H01M 8/1011* (2013.01); *H01M 8/1018* (2013.01); *H01M 8/1055* (2013.01); *H01M 2008/1095* (2013.01); *Y02E 60/50* (2013.01)

(58) Field of Classification Search
CPC ......... H01M 4/925; H01M 2008/1095; H01M 8/04197; H01M 4/92; H01M 8/106; H01M 8/1055; H01M 8/1011; Y02E 60/523; Y02E 60/50
See application file for complete search history.

(56) References Cited

U.S. PATENT DOCUMENTS

| | | | |
|---|---|---|---|
| 2011/0091789 A1* | 4/2011 | Mofakhami | C25B 1/02 429/482 |
| 2015/0247258 A1* | 9/2015 | Diankov | H01M 4/8817 117/106 |
| 2016/0013462 A1* | 1/2016 | Cui | H01M 4/1395 429/126 |
| 2016/0281221 A1* | 9/2016 | Kim | C23C 16/56 |

FOREIGN PATENT DOCUMENTS

| | | |
|---|---|---|
| KR | 10-2013-0064359 A | 6/2013 |
| KR | 10-2014-0115868 A | 10/2014 |

OTHER PUBLICATIONS

Amir Pakdel et al., "Plasma-Assisted Interface Engineering of Boron Nitride Nanostructure Films", ACS Nano, Oct. 7, 2014, pp. 10631-10639, vol. 8.

Rohit N. Marnik, "Breakthrough for protons", Nature, Nov. 26, 2014, pp. 173-175, vol. 516.

* cited by examiner

FUEL CELL MEMBRANE ELECTRODE ASSEMBLY (MEA) WITH HEXAGONAL BORON NITRIDE THIN FILM

CROSS-REFERENCE TO RELATED APPLICATION

This application claims the benefit of Korean Patent Application Nos. 10-2017-0024327 and 10-2017-0024328, filed on Feb. 23, 2017, and Korean Patent Application No. 10-2017-0024584, filed on Feb. 24, 2017, in the Korean Intellectual Property Office, the disclosures of which are incorporated herein by reference.

BACKGROUND

1. Field of the Invention

One or more example embodiments relate to a fuel cell membrane electrode assembly (MEA) including a hexagonal boron nitride (h-BN) thin film.

2. Description of the Related Art

Hexagonal boron nitride (h-BN) has a honeycomb structure with a two-dimensionally strong $sp^2$ covalent bond similar to graphene, and is a material that receives attention due to its high mechanical strength and thermal conductivity. Graphene has semimetallic properties and a band gap of zero, whereas h-BN is an insulator with a direct band gap of 5 eV to 6 eV which is caused by a partial ionic bond between B and N. Also, unlike graphene, h-BN is known to be chemically stable in a high-temperature atmosphere, for example, 1,000° C.

Purified h-BN has an exciton emission band that is sensitive to a wavelength of 215 nanometers (nm) to 227 nm, which is a sufficient value to lead to an induced emission. Thus, high-performance h-BN may be used as a material that is useful to develop deep ultraviolet (UV) optoelectronic devices with wavelengths shorter than UV.

Recently, research has been conducted on a method of producing cubic boron nitride, in which a mixture containing hexagonal boron nitride and a catalyst is maintained under pressure and temperature conditions that thermodynamically favor the stable presence of cubic boron nitride, thereby forming composite lumps containing cubic boron nitride, which are dissolved in an alkaline solution to recover cubic boron nitride. However, there is still a demand in the industry for a method of preparing single-layer hexagonal boron nitride with a higher performance and a large area.

Fuel cells are energy conversion devices that are eco-friendly and have a high efficiency, and are receiving attention as a technology to lead a low-carbon-based industry in the future. In particular, fuel cells are highly expected to be applied as portable electronic devices, household and transportation energy conversion devices.

Fuel cells are classified as a polymer electrolyte membrane fuel cell (PEMFC), a direct methanol fuel cell (DMFC), a phosphoric acid fuel cell (PAFC), a molten carbonate fuel cell (MCFC), a solid oxide fuel cell (SOFC), and the like, based on a type of fuel used and a used electrolyte.

Typically, a PEMFC and a DMFC each include a membrane electrode assembly (MEA) that includes an anode, a cathode and a polymer electrolyte membrane that is located between the anode and the cathode. Fuel cells operate based on a principle below. A fuel oxidation reaction occurs in an anode to which hydrogen or fuel is supplied, and hydrogen ions generated in the anode are conducted to a cathode through a polymer electrolyte membrane. Also, an oxygen reduction reaction occurs in the cathode to which oxygen is supplied, which lead to a difference between voltages of the above two electrodes to generate electricity.

In a fuel cell, an anode includes a catalyst to promote a reaction of generating hydrogen ions by oxidizing fuel, and a cathode includes a catalyst to promote an oxygen reduction. Also, a fuel cell catalyst generally includes catalytic metal particles and a carrier that has a high electrical conductivity to uniformly disperse the catalytic metal particles.

An MEA of a fuel cell generally includes a polymer electrolyte membrane as described above, and the polymer electrolyte membrane may also be called a "thin film." A Nafion membrane is typically commercialized as a polymer electrolyte membrane. The Nafion membrane is being widely used due to a high hydrogen ion conductivity, an excellent chemical stability, an ion selectivity, and the like. However, an industrial applicability of the Nafion membrane is limited due to a high price, and the Nafion membrane has an issue of a high methanol crossover in which methanol passes through a polymer membrane in a process of operating a fuel cell. Also, since a high-temperature stability is reduced and an oxygen diffusion resistance increases when the Nafion membrane is used, a performance of a fuel cell is limited. To solve the above issues, various studies have been conducted on materials to replace the Nafion membrane.

SUMMARY

Example embodiments provide an improved fuel cell membrane electrode assembly (MEA) and a method of fabricating the fuel cell MEA that may prepare a hexagonal boron nitride thin film by paying attention to a high hydrogen ion transfer characteristic of hexagonal boron nitride and that may have a high efficiency.

Example embodiments provide a new fuel cell MEA and a method of fabricating the fuel cell MEA that may prepare and use a hexagonal boron nitride thin film as a thin film by paying attention to a high hydrogen ion transfer characteristic of hexagonal boron nitride and that may have a high efficiency even though an interfacial binding layer, for example, Nafion, and the like, is not included.

Example embodiments provide a new fuel cell MEA and a method of fabricating the fuel cell MEA that may prepare a hexagonal boron nitride thin film by paying attention to a high hydrogen ion transfer characteristic of hexagonal boron nitride and that may have a high efficiency even though an electrode layer of a metal base and an organic binder layer, for example, Nafion, and the like, are not included.

According to an aspect, there is provided a fuel cell MEA with a hexagonal boron nitride thin film, the fuel cell MEA including an anode layer, a hexagonal boron nitride thin film layer formed on the anode layer, an interfacial binding layer formed on the hexagonal boron nitride thin film layer, and a cathode layer formed on the interfacial binding layer.

The interfacial binding layer may include at least one of polytrifluorostyrene sulfonic acid (Nafion), poly(methylmethacrylate) (PMMA), platinum and a carbon supporter. The anode layer, the cathode layer or both may include at least one catalyst particle among platinum, ruthenium, a platinum alloy and core-shell structured platinum. The interfacial binding layer may have a thickness of 2 micrometers (μm) to 50 μm.

The hexagonal boron nitride thin film layer may have a thickness of 0.3 nanometers (nm) to 3 nm, and may include a single exchange membrane or a plurality of exchange membranes.

The hexagonal boron nitride thin film layer including the single exchange membrane may be a boron nitride monatomic layer.

The hexagonal boron nitride thin film layer may be functionalized by at least one of H, O and F.

According to another aspect, there is provided a fuel cell MEA with a hexagonal boron nitride thin film, the fuel cell MEA including an anode layer, a hexagonal boron nitride thin film layer formed on the anode layer, and a cathode layer formed on the hexagonal boron nitride thin film layer, wherein the fuel cell MEA is free of an interfacial binding layer.

The anode layer, the cathode layer or both may include at least one of a polymer ionomer of polytrifluorostyrene sulfonic acid (Nafion) or PMMA, platinum and a carbon supporter, or the anode layer, the cathode layer or both may include at least one polymer ionomer of polytrifluorostyrene sulfonic acid (Nafion) or PMMA, and dispersed metal catalyst particles.

The metal catalyst particles may be attached to a branch of the polymer ionomer.

The metal catalyst particles may be supported on carbon, and may include one of platinum, ruthenium, a platinum alloy and core-shell structured platinum.

The hexagonal boron nitride thin film layer may have a thickness of 0.3 nm to 3 nm.

The hexagonal boron nitride thin film layer may include a single exchange membrane or a plurality of exchange membranes.

The hexagonal boron nitride thin film layer including the single exchange membrane may be a boron nitride monatomic layer.

The hexagonal boron nitride thin film layer may be functionalized by at least one of H, O and F.

According to another aspect, there is provided a fuel cell MEA with a hexagonal boron nitride thin film, the fuel cell MEA including the hexagonal boron nitride thin film, and metal catalyst particles dispersedly formed on a surface of the hexagonal boron nitride thin film, wherein the fuel cell MEA is free of an organic binder and an interfacial binding layer.

The metal catalyst particles may include at least one of platinum, ruthenium, a platinum alloy and core-shell structured platinum.

The metal catalyst particles have a size of 3 nm to 7 nm.

The metal catalyst particles may be included in an amount of 0.1 milligram per square centimeter ($mg/cm^2$) to 0.2 $mg/cm^2$ per unit area of the hexagonal boron nitride thin film.

The hexagonal boron nitride thin film may include a single exchange membrane or a plurality of exchange membranes. The exchange membrane may include a boron nitride monatomic layer.

The hexagonal boron nitride thin film may be functionalized by at least one of H, O and F.

The hexagonal boron nitride thin film including the dispersedly formed metal catalyst particles may function as a thin film, a cathode and an anode of a fuel cell.

The fuel cell MEA may be free of a fuel cell electrode.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
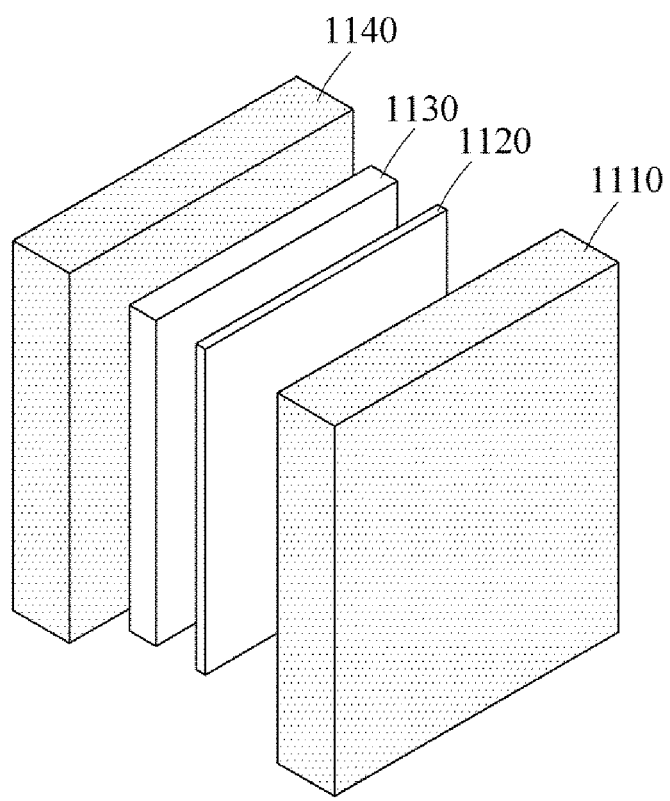
FIG. 1 is a diagram illustrating a structure of a fuel cell membrane electrode assembly (MEA) including a hexagonal boron nitride thin film according to an example embodiment.

Hereinafter, example embodiments of the present disclosure will be described in detail with reference to the accompanying drawings. Like reference numerals present in the drawings refer to the like elements throughout.

Various modifications may be made to the example embodiments. The example embodiments are not construed as limited to the disclosure and should be understood to include all changes, equivalents, and replacements within the idea and the technical scope of the disclosure.

The terminology used herein is for the purpose of describing particular example embodiments only and is not intended to be limiting of example embodiments. As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Regarding the reference numerals assigned to components in the drawings, it should be noted that the same components will be designated by the same reference numerals, wherever possible, even though they are shown in different drawings. Also, in describing of example embodiments, detailed description of well-known related structures or functions will be omitted when it is deemed that such description will cause ambiguous interpretation of the present disclosure.

In the present disclosure, a new fuel cell membrane electrode assembly (MEA) that employs a hexagonal boron nitride thin film as a thin film of the fuel cell MEA based on an excellent hydrogen ion transfer characteristic of the hexagonal boron nitride thin film, may be provided.

In a related art, it is difficult to prepare a hexagonal boron nitride thin film due to a large area, and it is technically difficult to form a single-layer hexagonal boron nitride thin film. According to an example embodiment, a method of preparing a new hexagonal boron nitride thin film in which all the above problems are solved may also be provided.

In the present disclosure, a method of forming a single-layer hexagonal boron nitride thin film, or a method of forming a multi-layer hexagonal boron nitride thin film by laminating a plurality of layers may be provided. A hexagonal boron nitride thin film may be used as a thin film of a fuel cell MEA, to realize a high-performance fuel cell.

FIG. 1 is a diagram illustrating a structure of a fuel cell MEA including a hexagonal boron nitride thin film according to an example embodiment.

Referring to FIG. 1, a fuel cell MEA 1100 may include an anode layer 1110, a hexagonal boron nitride thin film layer 1120 formed on the anode layer 1110, an interfacial binding layer 1130 formed on the hexagonal boron nitride thin film layer 1120, and a cathode layer 1140 formed on the interfacial binding layer 1130. In the present disclosure, the terms "interfacial binding layer" and "organic binder layer" may be interchangeably used with respect to each other.

According to an example embodiment, an MEA of a fuel cell may have a feature of laminating and using a hexagonal boron nitride thin film layer and an organic binder layer in the MEA. The hexagonal boron nitride thin film layer may be formed between an anode layer and the organic binder layer, and may function to enhance a performance of the fuel cell.

The interfacial binding layer 1130 may include one of polytrifluorostyrene sulfonic acid (Nafion), poly(methylmethacrylate) (PMMA), platinum and a carbon supporter.

According to an example embodiment, an interfacial binding layer may form a base material of a polymer electrolyte membrane of a fuel cell, and may include one of Nafion, PMMA, platinum and a carbon supporter. The interfacial binding layer may function as a supporter of the hexagonal boron nitride thin film layer to supplement a physical stiffness. Also, the interfacial binding layer may function as a binding layer to increase a binding force between a cathode and the hexagonal boron nitride thin film layer.

For example, when polytrifluorostyrene sulfonic acid (Nafion) is used as the interfacial binding layer, an ionic conductivity, a chemical stability, an ion selectivity, and the like may be excellent. However, Nafion has been a problem in a portion of driving environments due to a high methanol crossover of the Nafion during an operation of the fuel cell. According to an example embodiment, to solve a methanol crossover problem of a Nafion organic binder layer, an MEA including a hexagonal boron nitride thin film layer in addition to an interfacial binding layer may be formed.

The anode layer 1110, the cathode layer 1140 or both may include at least one catalyst particle, for example, platinum, ruthenium, a platinum alloy and core-shell structured platinum.

The hexagonal boron nitride thin film layer 1120 may have a thickness of 0.3 nanometers (nm) to 3 nm.

In an example, a hexagonal boron nitride thin film layer may be formed as a single monatomic layer. In this example, the hexagonal boron nitride thin film layer may have a thickness of 0.3 nm. In another example, when a multi-layer hexagonal boron nitride thin film is formed and when a thickness of the multi-layer hexagonal boron nitride thin film exceeds 3 nm, a hydrogen ion transfer capability may be significantly reduced during an operation of the fuel cell. Desirably, when a hexagonal boron nitride thin film layer is formed with a thickness of 0.3 nm to 1.7 nm, the hexagonal boron nitride thin film layer may exhibit a more excellent performance as an MEA of the fuel cell.

The hexagonal boron nitride thin film layer 1120 may include a single exchange membrane or a plurality of exchange membranes.

According to an example embodiment, a hexagonal boron nitride thin film layer may include a single exchange membrane, or an exchange membrane assembly in which a plurality of exchange membranes are formed, as needed.

The hexagonal boron nitride thin film layer 1120 may include a single exchange membrane and may be a boron nitride monatomic layer.

In an example, each of exchange membranes of a hexagonal boron nitride thin film layer may be formed as a single boron nitride monatomic layer. Forming of a hexagonal boron nitride thin film layer as a single monatomic layer may be possible under specific temperature and pressure conditions and using a properly selected substrate material. According to an example embodiment, a method of preparing a hexagonal boron nitride thin film layer as a single monatomic layer in a fuel cell MEA may be provided, which will be described below. When a hexagonal boron nitride thin film layer is included in an MEA of a fuel cell, the fuel cell may be more excellent in a chemical stability and a thermal stability, because the hexagonal boron nitride thin film layer is not a polymer, for example, Nafion or a hydrocarbon-based material.

In another example, based on an environment to which a fuel cell is applicable, each of exchange membranes of a hexagonal boron nitride thin film layer may be formed as a multi-layer boron nitride thin film formed by laminating a plurality of monatomic layers. Forming of a hexagonal boron nitride thin film layer in a multilayer structure may also be possible under specific temperature and pressure conditions and using a properly selected substrate material. According to an example embodiment, a method of preparing a hexagonal boron nitride thin film layer with a multi-layer structure in a fuel cell MEA may be provided. When a multi-layer hexagonal boron nitride thin film is formed and included in an MEA of a fuel cell, the MEA may exhibit an excellent effect in terms of an increase in mechanical properties.

The interfacial binding layer 1130 may have a thickness of 2 micrometers (μm) to 50 μm.

When the thickness of the interfacial binding layer 1130 is less than 2 μm, a physical stiffness may decrease. When the thickness of the interfacial binding layer 1130 exceeds 50 μm, a performance of the fuel cell may decrease due to an increase in a hydrogen ion transfer resistance. Desirably, the interfacial binding layer 1130 may have a thickness of 5 μm to 20 μm. The hexagonal boron nitride thin film layer 1120 may be functionalized by at least one of H, O and F.

According to an example embodiment, the hexagonal boron nitride thin film layer may be a hexagonal boron nitride thin film layer functionalized to include at least one component among H, O and F that are atoms forming a hydrogen bond. The functionalized hexagonal boron nitride thin film layer may include a B—H bond, a B—O bond, a B—F bond and a B—$F_2$ bond.

According to an example embodiment, in a state in which a hexagonal boron nitride thin film is formed on a substrate, an oxygen functionalization process and a hydrogen functionalization process may be performed using an oxygen plasma and a hydrogen plasma. Also, the hexagonal boron nitride thin film formed on the substrate may be exposed to a $XeF_2$ gas, to form a fluorine-functionalized hexagonal boron nitride thin film.

In an example, a fuel cell with a hexagonal boron nitride thin film may include a bipolar plate, a collector, and at least one unit cell including a fuel cell MEA according to an example embodiment.

In another example, a fuel cell may include a fuel cell MEA with a hexagonal boron nitride thin film according to an example embodiment, and additionally include a unit cell including a collector and a bipolar plate.

Figure 2:
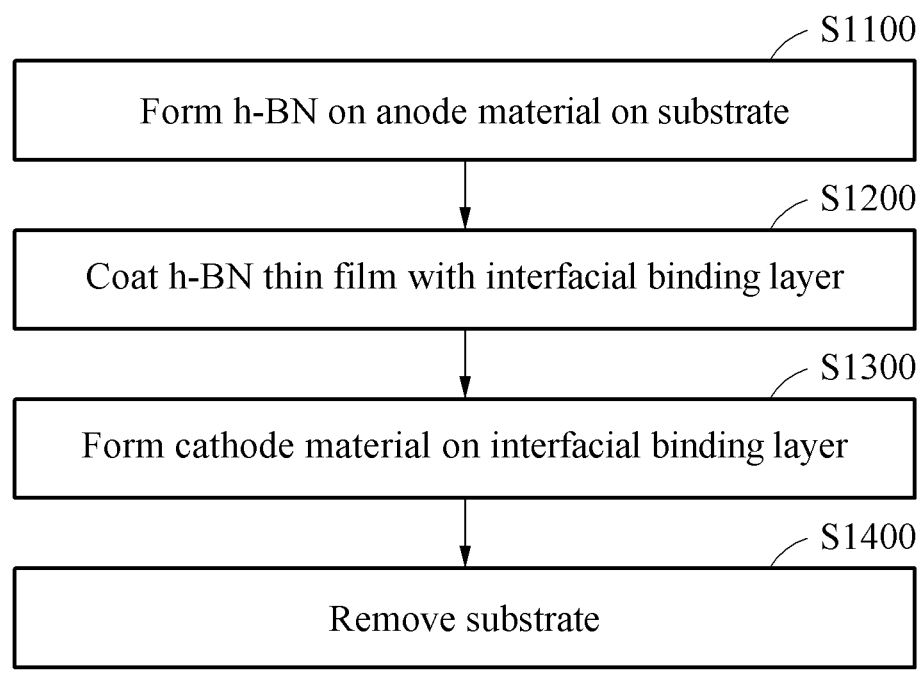
FIG. 2 is a flowchart illustrating an example of a method of fabricating a fuel cell MEA including a hexagonal boron nitride thin film according to an example embodiment.

FIG. 2 is a flowchart illustrating a method of fabricating a fuel cell MEA including a hexagonal boron nitride thin film according to an example embodiment.

Figure 3:
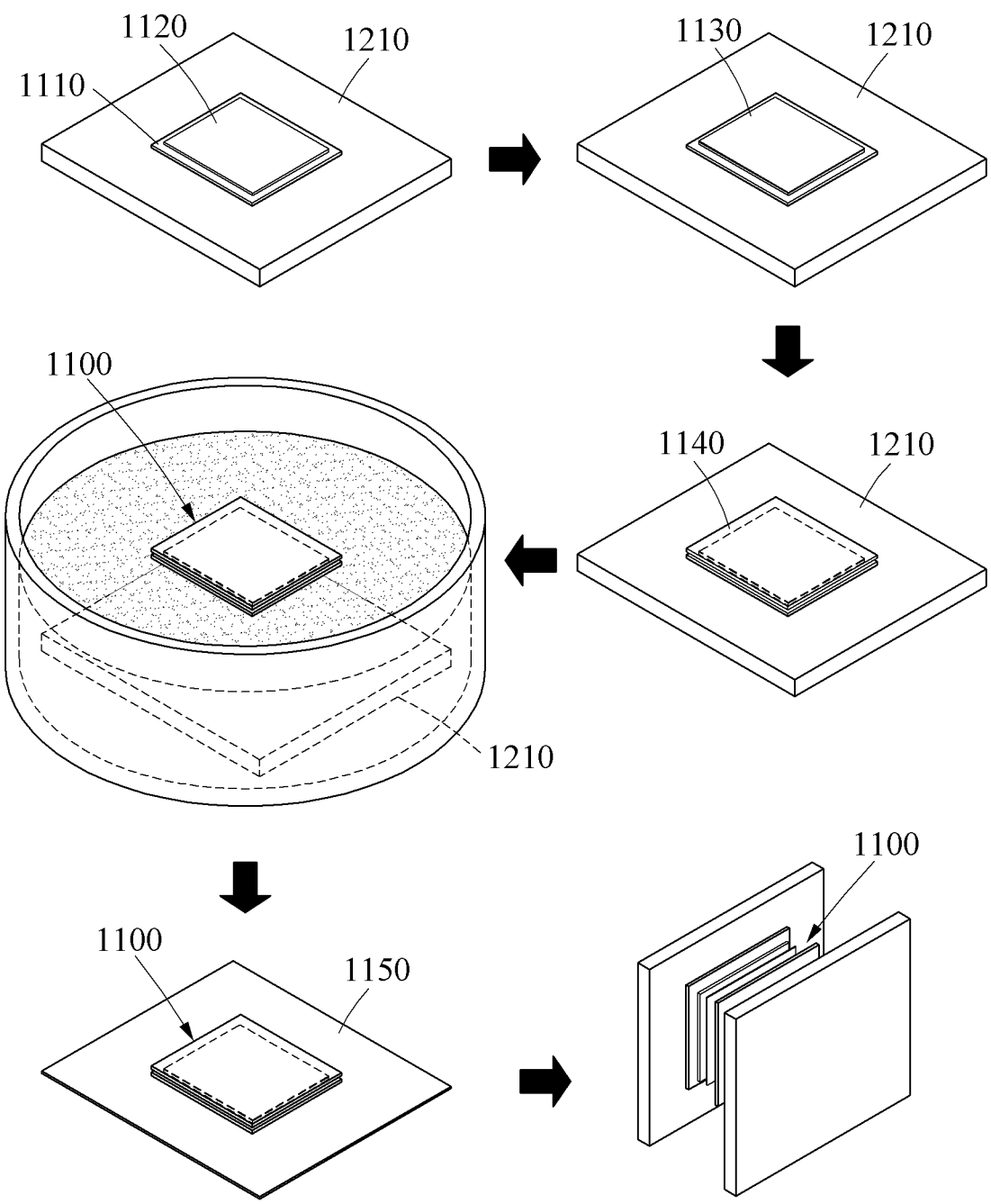
FIG. 3 is a diagram illustrating a process of fabricating a fuel cell MEA including a hexagonal boron nitride thin film according to an example embodiment.

FIG. 3 is a diagram illustrating a process of fabricating a fuel cell MEA including a hexagonal boron nitride thin film according to an example embodiment.

Hereinafter, a method of fabricating a fuel cell MEA including a hexagonal boron nitride thin film according to an example embodiment will be described with reference to FIGS. 2 and 3.

Referring to FIG. 2, the method may include operation S1100 of forming the hexagonal boron nitride thin film on an anode material on a substrate, operation S1200 of coating the hexagonal boron nitride thin film with an interfacial binding layer, operation S1300 of forming a cathode material on the interfacial binding layer, and operation S1400 of removing the substrate. The interfacial binding layer may include, for example, at least one of Nafion, platinum and a carbon supporter.

Referring to FIG. 3, the method may include forming an anode layer 1110 on a substrate 1210 and printing and forming a hexagonal boron nitride thin film layer 1120 onto the anode layer 1110. The substrate 1210 may be formed of a material including at least one of $SiO_2$, Si and sapphire. The material of the substrate 1210 may desirably be, for example, a material on which an anode material is formed and that is suitable to be separated from the anode material. The substrate 1210 may function as a mold to form a laminate structure of a fuel cell MEA and may be separated from the fuel cell MEA after the laminate structure is formed.

Also, the method may include forming an interfacial binding layer 1130 on the hexagonal boron nitride thin film layer 1120, and forming a cathode layer 1140 on the interfacial binding layer 1130. Thus, the laminate structure of the fuel cell MEA may be formed. In an acidic aqueous solution environment, the substrate 1210 may be removed from a fuel cell MEA 1100.

When the substrate 1210 is removed, drying on a hot plate, sealing an edge or both may be performed. Thus, the fuel cell MEA 1100 with a hexagonal boron nitride thin film according to an example embodiment may be secured.

In a method of preparing a hexagonal boron nitride thin film according to an example embodiment, the hexagonal boron nitride thin film may be provided in a structure of a single monatomic layer, or a multi-layer structure in which a plurality of monatomic layers are laminated.

Figure 4:
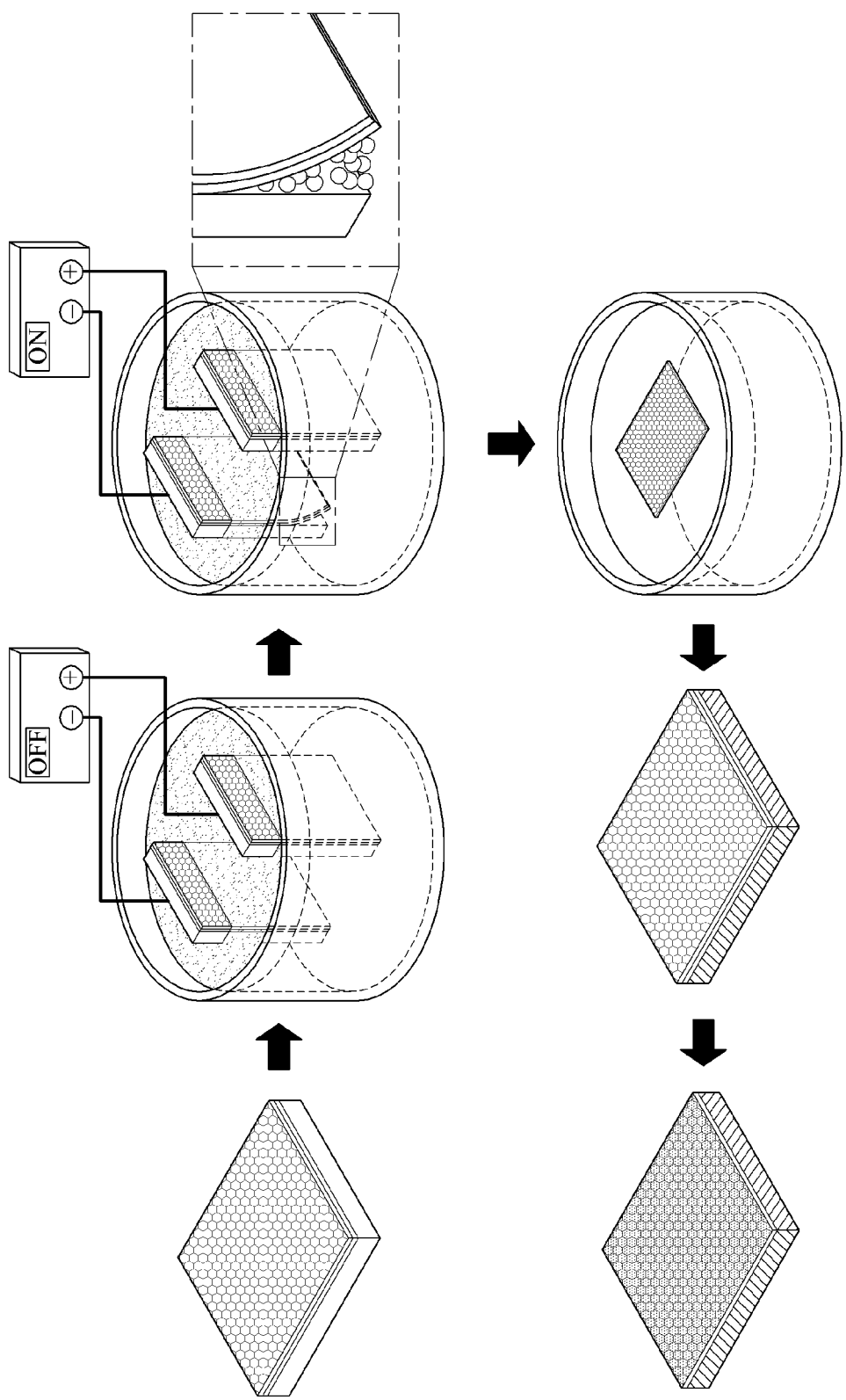
FIG. 4 is a diagram illustrating a process of printing a hexagonal boron nitride thin film with a single monatomic layer according to an example embodiment.

FIG. 4 is a diagram illustrating a process of printing a hexagonal boron nitride thin film with a single monatomic layer according to an example embodiment.

A first drawing of FIG. 4 illustrates a structure in which the hexagonal boron nitride thin film on a platinum auxiliary substrate is coated with a PMMA supporter. In a second drawing of FIG. 4, the hexagonal boron nitride thin film coated with the PMMA supporter is mounted in an electrolysis apparatus. In a third drawing of FIG. 4, hydrogen gas bubbles may be generated between the hexagonal boron nitride thin film and the platinum auxiliary substrate by supplying current to the electrolysis apparatus, and the hexagonal boron nitride thin film coated with the PMMA supporter may be separated from the platinum auxiliary substrate. In a fourth drawing of FIG. 4, the separated hexagonal boron nitride thin film may be washed with distilled water. In a fifth drawing of FIG. 4, the washed hexagonal boron nitride thin film may be printed on an arbitrary substrate. In a sixth drawing of FIG. 4, the PMMA supporter may be removed from the printed hexagonal boron nitride thin film using acetone, to obtain the hexagonal boron nitride thin film.

Figure 5:
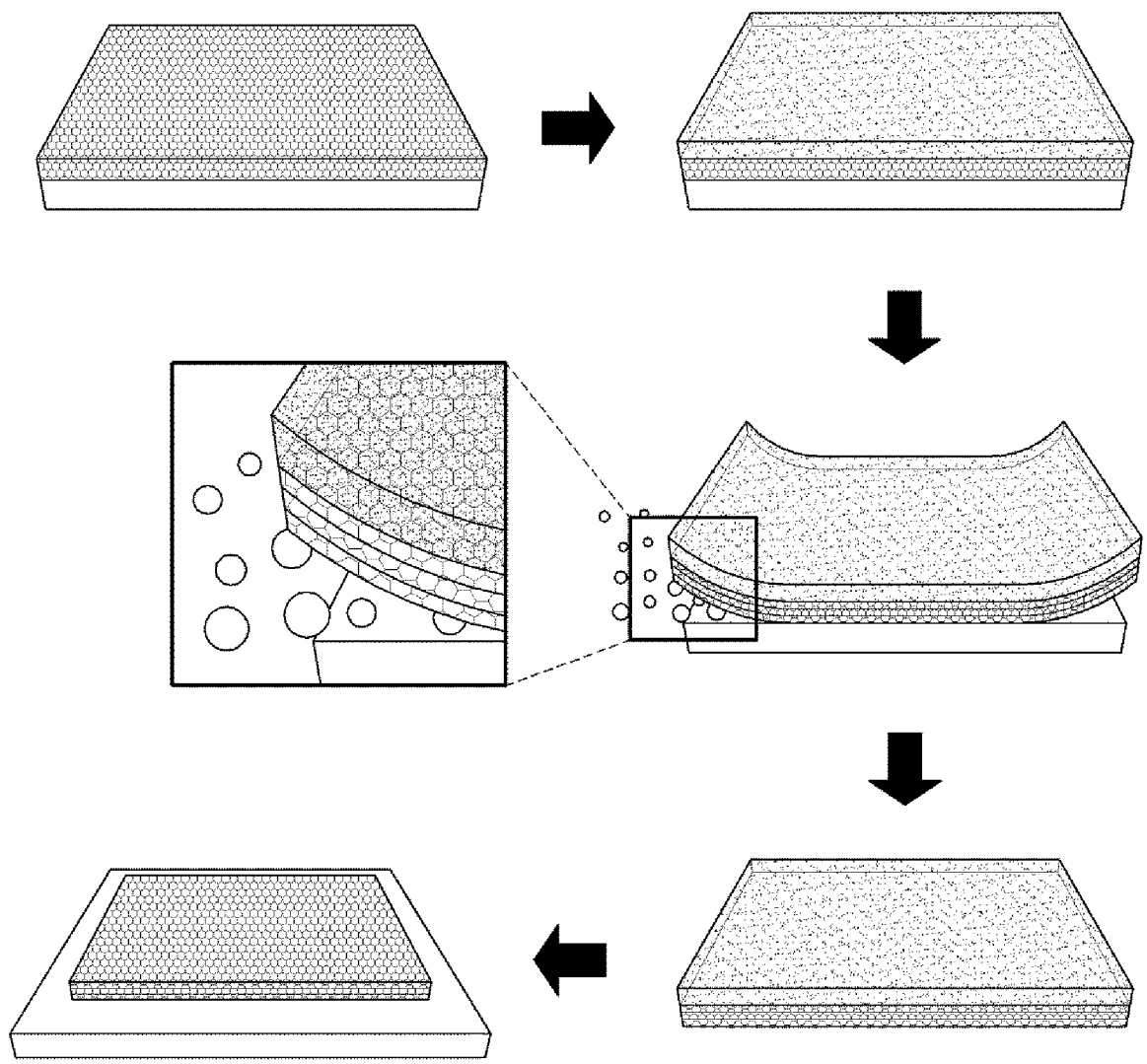
FIG. 5 is a diagram illustrating a process of printing a multi-layer hexagonal boron nitride thin film according to an example embodiment.

FIG. 5 is a diagram illustrating a process of printing a multi-layer hexagonal boron nitride thin film according to an example embodiment.

A first drawing of FIG. 5 illustrates a structure in which a multi-layer hexagonal boron nitride thin film is printed on a sapphire auxiliary substrate. A second drawing of FIG. 5 illustrates a structure in which the multi-layer hexagonal boron nitride thin film on the sapphire auxiliary substrate is coated with a PMMA supporter. In a third drawing of FIG. 5, the PMMA supporter and the multi-layer hexagonal boron nitride thin film may be separated from the sapphire auxiliary substrate using an aluminum etchant. A fourth drawing of FIG. 5 illustrates the separated PMMA supporter and the separated multi-layer hexagonal boron nitride thin film. In a fifth drawing of FIG. 5, the separated PMMA supporter and the separated multi-layer hexagonal boron nitride thin film may be printed on an arbitrary substrate, and the PMMA supporter may be removed from the multi-layer hexagonal boron nitride thin film using acetone, to obtain the multi-layer hexagonal boron nitride thin film.

Hereinafter, a method of printing a single-layer or multi-layer hexagonal boron nitride thin film according to an example embodiment will be described with reference to the above-described processes of FIGS. 4 and 5.

In the present disclosure, an operation of preparing a hexagonal boron nitride thin film may include heating ammonia borane using a chemical vapor deposition (CVD) process, and diffusing the heated ammonia borane into a furnace maintained at a high temperature using a hydrogen gas and forming a hexagonal boron nitride thin film on an auxiliary substrate that is in the furnace.

The ammonia borane may be heated at a temperature of 80° C. to 130° C. The furnace may be maintained at a temperature of 800° C. to 1500° C.

According to an example embodiment, an operation of preparing a hexagonal boron nitride thin film may include forming the hexagonal boron nitride thin film on an auxiliary substrate, and separating the hexagonal boron nitride thin film from the auxiliary substrate.

The CVD process may be used to form the hexagonal boron nitride thin film on the auxiliary substrate.

The auxiliary substrate may include platinum, and the CVD process may be performed at a temperature of 800° C. to 1100° C. and a pressure of 0.1 Torr to 0.15 Torr.

For example, a material of the auxiliary substrate may include platinum and the CVD process may be performed under the above temperature and pressure conditions, to form a hexagonal boron nitride thin film with a single homogeneous monatomic layer.

The auxiliary substrate may include sapphire, and the CVD process may be performed at a temperature of 1400° C. to 1500° C. and a pressure of 0.1 Torr to 0.15 Torr.

Thus, the hexagonal boron nitride thin film may be formed with multiple layers. For example, a material of the auxiliary substrate may include sapphire and the CVD process may be performed under the temperature and pressure conditions, to form a homogeneous multi-layer hexagonal boron nitride thin film.

Since a platinum substrate or a sapphire substrate is expensive and chemically inert, recycling is very important. Using the methods according to an example embodiment, a hexagonal boron nitride thin film formed on a platinum substrate or a sapphire substrate may be successfully transferred to an arbitrary substrate, and thus the platinum substrate or the sapphire substrate may be recycled.

Also, the auxiliary substrate may be formed of platinum or sapphire, which is one of significant features in a method of fabricating a fuel cell MEA in the present disclosure. For example, when a nickel foil or a copper foil is used to form the auxiliary substrate, it is impossible to form a hexagonal boron nitride thin film with a single homogeneous monatomic layer or to form a homogeneous multi-layer hexagonal boron nitride thin film, as intended in the present disclosure.

The temperature and pressure conditions for the CVD process are also one of the significant features in the method. When the temperature and the pressure are out of the above ranges, a hexagonal boron nitride thin film with a single homogeneous monatomic layer, or a homogeneous multi-layer hexagonal boron nitride thin film may not be obtained, or a monatomic layer with a uniform shape may not be formed.

The separating of the hexagonal boron nitride thin film from the auxiliary substrate may include laminating a supporter including at least one of PMMA, polyvinyl alcohol and polystyrene on the hexagonal boron nitride thin film formed on the auxiliary substrate, separating the supporter and the hexagonal boron nitride thin film from the auxiliary substrate, and removing the supporter from the hexagonal boron nitride thin film using an organic solvent to obtain the hexagonal boron nitride thin film.

The supporter and the hexagonal boron nitride thin film may be separated from the auxiliary substrate, using an aluminum etchant or hydrogen gas bubbles generated by an electrolysis.

For example, a process of using hydrogen gas bubbles generated by the electrolysis may include mounting the auxiliary substrate, the hexagonal boron nitride thin film and the supporter formed on the hexagonal boron nitride thin film in one electrode portion of an electrolysis apparatus in a solvent environment including NaOH, performing the electrolysis, and forming a hydrogen gas.

The aluminum etchant may include at least one of HF, $HNO_3$ and $H_3PO_4$. To separate the supporter and the hexagonal boron nitride thin film from the auxiliary substrate using the aluminum etchant, a method of floating h-BN grown on a sapphire substrate on an aluminum etchant and separating the sapphire substrate and a hexagonal boron nitride thin film may be used.

The substrate may be removed in an acidic aqueous solution that may include at least one of HF, $H_2NO_3$ and $H_3PO_4$.

For example, the substrate may be removed using a method of removing an interaction between the substrate and the hexagonal boron nitride thin film in an acidic aqueous solution. In this example, since the substrate is removed in the acidic aqueous solution, it is possible to obtain an effect of separating h-BN from the substrate.

According to an example embodiment, a new fuel cell MEA that employs a hexagonal boron nitride thin film as a hydrogen ion transfer film by removing an interfacial binding layer, such as Nafion, after an excellent hydrogen ion transfer characteristic of the hexagonal boron nitride thin film is verified and an availability of the hexagonal boron nitride thin film as a thin film is tested, may be provided.

In the related art, it is difficult to prepare a hexagonal boron nitride thin film due to a large area, and it is technically difficult to form a single-layer hexagonal boron nitride thin film. According to an example embodiment, a method of preparing a new hexagonal boron nitride thin film in which all the above problems are solved may also be provided.

Figure 9:
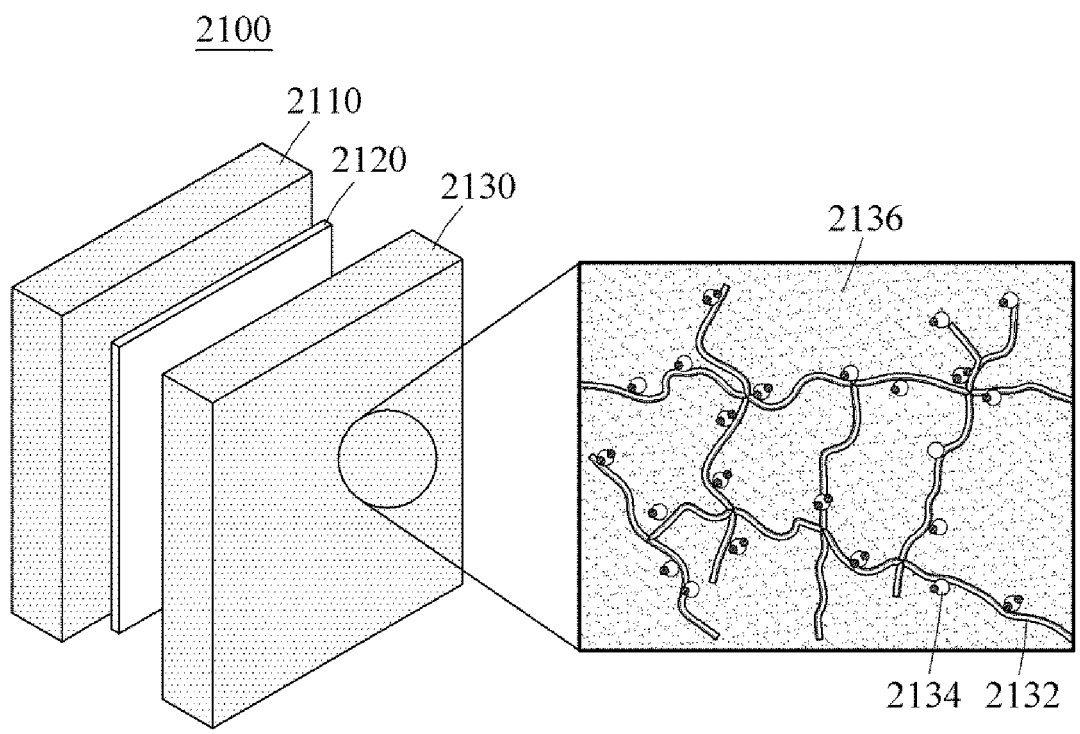
FIG. 9 is a diagram illustrating a fuel cell MEA that includes a hexagonal boron nitride thin film layer and that is free of an interfacial binding layer according to an example embodiment.

In the present disclosure, a fuel cell MEA may include a hexagonal boron nitride thin film layer formed as a hydrogen ion transfer film between an anode layer and a cathode layer. FIG. 9 is a diagram illustrating a fuel cell MEA that includes a hexagonal boron nitride thin film layer and that is free of an interfacial binding layer according to an example embodiment.

Referring to FIG. 9, a fuel cell MEA 2110 may include a hexagonal boron nitride thin film layer 2120 formed between an anode layer 2110 and a cathode layer 2130. The fuel cell MEA 1110 of FIG. 1 may not separately include an interfacial binding material, for example, a Nafion film, between both electrodes.

The fuel cell MEA 2110 may be free of an interfacial binding layer, and may include the anode layer 2110, the hexagonal boron nitride thin film layer 2120 formed on the anode layer 2110, and the cathode layer 2130 formed on the hexagonal boron nitride thin film layer 2120.

According to an example embodiment, a hexagonal boron nitride thin film may be provided as an MEA of a fuel cell. The hexagonal boron nitride thin film may function as a thin film or a polymer electrolyte membrane of the fuel cell MEA, due to a high hydrogen ion transfer characteristic of hexagonal boron nitride.

The fuel cell MEA may be free of an interfacial binding layer.

According to an example embodiment, an MEA may not include an interfacial binding material that forms a separate layer structure. Since the MEA does not include the interfacial binding layer, a chemical durability may be enhanced, a problem of a methanol crossover may be solved and an oxygen diffusion resistance may increase, to realize a fuel cell with an enhanced performance.

The anode layer 2110, the cathode layer 2130 or both may include at least one of a polymer ionomer of PMMA or polytrifluorostyrene sulfonic acid (Nafion), platinum and a carbon supporter.

The anode layer 2110, the cathode layer 2130 or both may include at least one polymer ionomer of PMMA or polytrifluorostyrene sulfonic acid (Nafion), and dispersed metal catalyst particles. The metal catalyst particles may be attached to a branch of the polymer ionomer.

As shown in FIG. 9, at least one of the anode layer 2110 and the cathode layer 2130 may include a long and twisted polymer ionomer 2132 and a metal catalyst particle 2134 formed and dispersed on the polymer ionomer 2132. For example, a polymer ionomer formed on an electrode layer may function to bind a particle solid such as Pt/C in the electrode layer and function to transfer a hydrogen ion into the electrode layer. Also, metal catalyst particles dispersed on the polymer ionomer may function to transfer a hydrogen ion in the electrode layer.

The metal catalyst particle 2134 may be supported on carbon, and may include one of platinum, ruthenium, a platinum alloy and core-shell structured platinum.

The metal catalyst particle 2134 may be supported on carbon and dispersed on the polymer ionomer 2132, instead of being included as a metal fine particle, and thus may have an effect of effectively performing a medium function to prevent metal from freely moving and to evenly transfer electrons to a catalyst.

The hexagonal boron nitride thin film layer 2120 may have a thickness of 0.3 nm to 3 nm.

In an example, the hexagonal boron nitride thin film layer may be formed as a single monatomic layer. In this example, the hexagonal boron nitride thin film layer may have a thickness of 0.3 nm. In another example, when a multi-layer hexagonal boron nitride thin film is formed and when a thickness of the multi-layer hexagonal boron nitride thin film exceeds 3 nm, a hydrogen ion transfer capability may be significantly reduced during an operation of the fuel cell. Desirably, when a hexagonal boron nitride thin film layer is formed with a thickness of 0.3 nm to 1.7 nm, the hexagonal boron nitride thin film layer may exhibit a more excellent performance as an MEA of the fuel cell.

The hexagonal boron nitride thin film layer 2120 may include a single exchange membrane or a plurality of exchange membranes.

According to an example embodiment, a hexagonal boron nitride thin film layer may include a single exchange membrane, or an exchange membrane assembly in which a plurality of exchange membranes are formed, as needed.

The hexagonal boron nitride thin film layer 2120 may include a single exchange membrane and may be a boron nitride monatomic layer.

In an example, each of exchange membranes of a hexagonal boron nitride thin film layer may be formed as a single boron nitride monatomic layer. Forming of a hexagonal boron nitride thin film layer as a single monatomic layer may be possible under specific temperature and pressure conditions and using a properly selected substrate material. According to an example embodiment, a method of preparing a hexagonal boron nitride thin film layer as a single monatomic layer in a fuel cell MEA may be provided, which will be described below. When a hexagonal boron nitride thin film layer is included in an MEA of a fuel cell, the fuel cell may be more excellent in a chemical stability and a thermal stability, because the hexagonal boron nitride thin film layer is not a polymer, for example, Nafion or a hydrocarbon-based material. In this example, when the hexagonal boron nitride thin film layer is formed as a single monatomic layer, a thickness of the hexagonal boron nitride thin film layer may be reduced and a hydrogen ion transfer resistance value may decrease, and accordingly a performance of the fuel cell MEA may increase.

In another example, based on an environment to which a fuel cell is applicable, each of exchange membranes of a hexagonal boron nitride thin film layer may be formed as a multi-layer boron nitride thin film formed by laminating a plurality of monatomic layers. Forming of a hexagonal boron nitride thin film layer in a multilayer structure may also be possible under specific temperature and pressure conditions and using a properly selected substrate material. According to an example embodiment, a method of preparing a hexagonal boron nitride thin film layer with a multi-layer structure in a fuel cell MEA may be provided. When a multi-layer hexagonal boron nitride thin film is formed and included in an MEA of a fuel cell, the MEA may exhibit an excellent effect in terms of an increase in mechanical properties.

The hexagonal boron nitride thin film layer 2120 may be functionalized by at least one of H, O and F.

According to an example embodiment, the hexagonal boron nitride thin film may be functionalized to include at least one component among H, O and F that are atoms forming a hydrogen bond. The functionalized hexagonal boron nitride thin film may include at least one of a B—H bond, a B—O bond, a B—F bond and a B—$F_2$ bond. The functionalized hexagonal boron nitride thin film may have an effect of enhancing a hydrogen ion transfer capability by lowering an energy barrier for passing hydrogen ions.

According to an example embodiment, in a state in which a hexagonal boron nitride thin film is formed on a substrate, an oxygen functionalization process and a hydrogen functionalization process may be performed using an oxygen plasma and a hydrogen plasma. Also, the hexagonal boron nitride thin film formed on the substrate may be exposed to a $XeF_2$ gas, to form a fluorine-functionalized hexagonal boron nitride thin film. Thus, the hexagonal boron nitride thin film may include at least one of a B—H bond, a B—O bond, a B—F bond and a B—$F_2$ bond on a surface of the hexagonal boron nitride thin film.

According to an example embodiment, a hexagonal boron nitride thin film layer may have a high hydrogen ion transfer characteristic, and thus may function as a thin film that is generally fabricated with Nafion according to the related art.

In an example, a fuel cell that includes a hexagonal boron nitride thin film and that is free of an interfacial binding layer, may include a bipolar plate, a collector, and at least one unit cell including a fuel cell MEA according to an example embodiment.

In another example, a fuel cell may include a fuel cell MEA with a hexagonal boron nitride thin film according to an example embodiment, and additionally include a unit cell including a collector and a bipolar plate.

Figure 10:
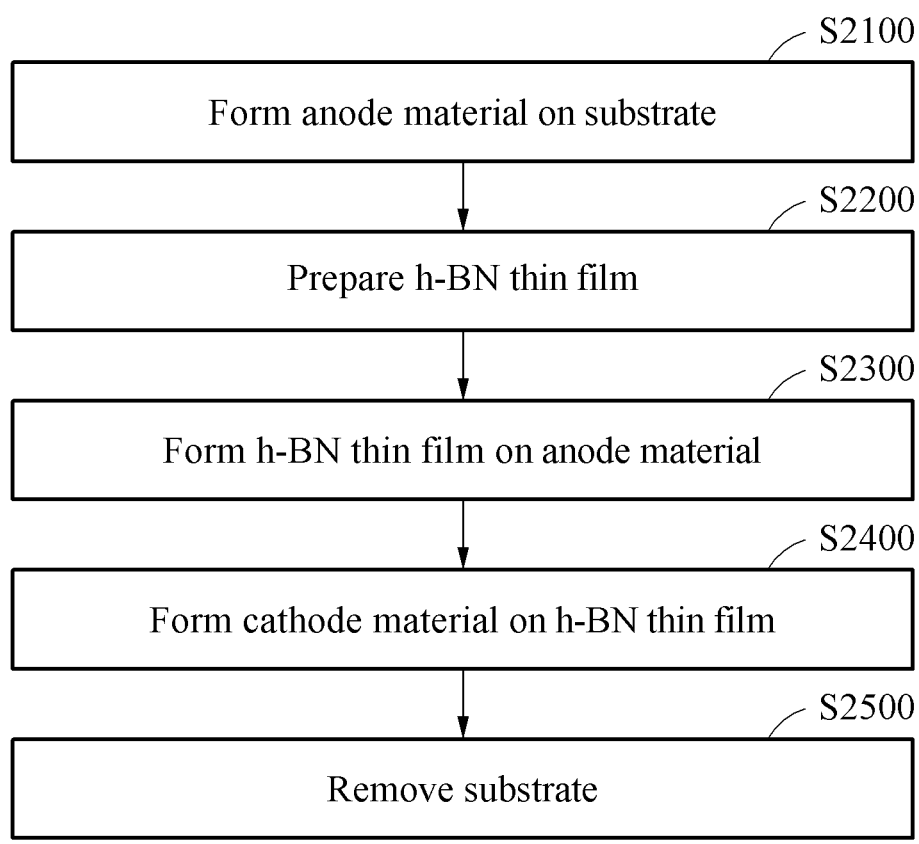
FIG. 10 is a flowchart illustrating a method of fabricating a fuel cell MEA that includes a hexagonal boron nitride thin film layer and that is free of an interfacial binding layer according to an example embodiment.

FIG. 10 is a flowchart illustrating a method of fabricating a fuel cell MEA that includes a hexagonal boron nitride thin film layer and that is free of an interfacial binding layer according to an example embodiment.

Hereinafter, a method of fabricating a fuel cell MEA that includes a hexagonal boron nitride thin film layer and that is free of an interfacial binding layer according to an example embodiment will be described with reference to FIG. 10.

The method of FIG. 10 may include operation S2100 of forming an anode material on a substrate, operation S2200 of preparing a hexagonal boron nitride thin film, operation S2300 of forming the hexagonal boron nitride thin film on the anode material, operation S2400 of forming a cathode material on the hexagonal boron nitride thin film, and operation S2500 of removing the substrate.

Operation S2200 may include forming the hexagonal boron nitride thin film on an auxiliary substrate, and separating the hexagonal boron nitride thin film from the auxiliary substrate.

In a method of preparing a hexagonal boron nitride thin film according to an example embodiment, the hexagonal boron nitride thin film may be provided in a structure of a single monatomic layer, or a multi-layer structure in which a plurality of monatomic layers are laminated.

The CVD process may be used to form the hexagonal boron nitride thin film on the auxiliary substrate.

The forming of the hexagonal boron nitride thin film may include heating ammonia borane using a CVD process, and diffusing the heated ammonia borane into a furnace maintained at a high temperature using a hydrogen gas and forming a hexagonal boron nitride thin film on an auxiliary substrate that is in the furnace. The CVD process may include, for example, a low pressure CVD (LPCVD) process.

The ammonia borane may be heated at a temperature of 80° C. to 130° C. The furnace may be maintained at a temperature of 800° C. to 1500° C.

The auxiliary substrate may include platinum, and the CVD process may be performed at a temperature of 800° C. to 1100° C. and a pressure of 0.1 Torr to 0.15 Torr.

For example, a material of the auxiliary substrate may include platinum and the CVD process may be performed under the above temperature and pressure conditions, to form a hexagonal boron nitride thin film with a single homogeneous monatomic layer.

The auxiliary substrate may include sapphire, and the CVD process may be performed at a temperature of 1400° C. to 1500° C. and a pressure of 0.1 Torr to 0.15 Torr. Thus, the hexagonal boron nitride thin film may be formed with multiple layers. For example, a material of the auxiliary substrate may include sapphire and the CVD process may be performed under the temperature and pressure conditions, to form a homogeneous multi-layer hexagonal boron nitride thin film.

Since a platinum substrate or a sapphire substrate is expensive and chemically inert, recycling is very important. Using the methods according to an example embodiment, a hexagonal boron nitride thin film formed on a platinum substrate or a sapphire substrate may be successfully transferred to an arbitrary substrate, and thus the platinum substrate or the sapphire substrate may be recycled.

Also, the auxiliary substrate may be formed of platinum or sapphire, which is one of significant features in a method of fabricating a fuel cell MEA in the present disclosure. For example, when a nickel foil or a copper foil is used to form the auxiliary substrate, it is impossible to form a hexagonal boron nitride thin film with a single homogeneous monatomic layer or to form a homogeneous multi-layer hexagonal boron nitride thin film, as intended in the present disclosure.

The temperature and pressure conditions for the CVD process are also one of the significant features in the method. When the temperature and the pressure are out of the above ranges, a hexagonal boron nitride thin film with a single homogeneous monatomic layer, or a homogeneous multi-layer hexagonal boron nitride thin film may not be obtained, or a monatomic layer with a uniform shape may not be formed.

The separating of the hexagonal boron nitride thin film from the auxiliary substrate may include laminating a supporter including one of PMMA, polyvinyl alcohol and polystyrene on the hexagonal boron nitride thin film formed on the auxiliary substrate, separating the supporter and the hexagonal boron nitride thin film from the auxiliary substrate, and removing the supporter from the hexagonal boron nitride thin film using an organic solvent to obtain the hexagonal boron nitride thin film.

The supporter and the hexagonal boron nitride thin film may be separated from the auxiliary substrate, using an aluminum etchant or hydrogen gas bubbles generated by an electrolysis.

For example, a process of using hydrogen gas bubbles generated by the electrolysis may include mounting the auxiliary substrate, the hexagonal boron nitride thin film and the supporter formed on the hexagonal boron nitride thin film in one electrode portion of an electrolysis apparatus in a solvent environment including NaOH, performing the electrolysis, and forming a hydrogen gas.

The aluminum etchant may include at least one of HF, $HNO_3$ and $H_3PO_4$. To separate the supporter and the hexagonal boron nitride thin film from the auxiliary substrate using the aluminum etchant, a method of floating a hexagonal boron nitride thin film grown on a sapphire substrate on an aluminum etchant and separating the sapphire substrate and the hexagonal boron nitride thin film may be used.

Operation S2100, operation S2400 or both may include mixing the anode material or the cathode material with a polymer ionomer and metal catalyst particles. The polymer ionomer may be a Nafion ionomer. The metal catalyst particles may be platinum catalyst particles supported on carbon.

Operation S2100, operation S2400 or both may further include binding the metal catalyst particles to the polymer ionomer, prior to the mixing of the anode material or the cathode material with the polymer ionomer and the metal catalyst particles.

The method of FIG. 10 may further include at least one of exposing the separated hexagonal boron nitride thin film layer to an oxygen plasma, exposing the separated hexagonal boron nitride thin film layer to a hydrogen plasma, and exposing the separated hexagonal boron nitride thin film layer to a $XeF_2$ gas.

The hexagonal boron nitride thin film layer may be functionalized using the method to include at least one component among H, O and F that are atoms forming a hydrogen bond. The functionalized hexagonal boron nitride thin film layer may include a B—H bond, a B—O bond, a B—F bond a B—$F_2$ bond.

According to an example embodiment, in a state in which a hexagonal boron nitride thin film is formed on a substrate, an oxygen functionalization process and a hydrogen functionalization process may be performed using an oxygen plasma and a hydrogen plasma. Also, the hexagonal boron nitride thin film formed on the substrate may be exposed to a $XeF_2$ gas, to form a fluorine-functionalized hexagonal boron nitride thin film.

According to an example embodiment, a new fuel cell MEA that employs a hexagonal boron nitride thin film on which metal catalyst nanoparticles are dispersedly formed, by verifying an excellent hydrogen ion transfer characteristic of the hexagonal boron nitride thin film and an availability of the hexagonal boron nitride thin film as a thin film, may be provided.

In the related art, it is difficult to prepare a hexagonal boron nitride thin film due to a large area, and it is technically difficult to form a single-layer hexagonal boron nitride thin film. According to an example embodiment, a method of preparing a new hexagonal boron nitride thin film in which all the above problems are solved may also be provided.

In the present disclosure, a method of forming a single-layer hexagonal boron nitride thin film, or a method of forming a multi-layer hexagonal boron nitride thin film by laminating a plurality of layers may be provided. Metal catalyst particles may be dispersedly formed on a surface of a formed hexagonal boron nitride thin film, so as to be used as a fuel cell MEA.

Figure 12:
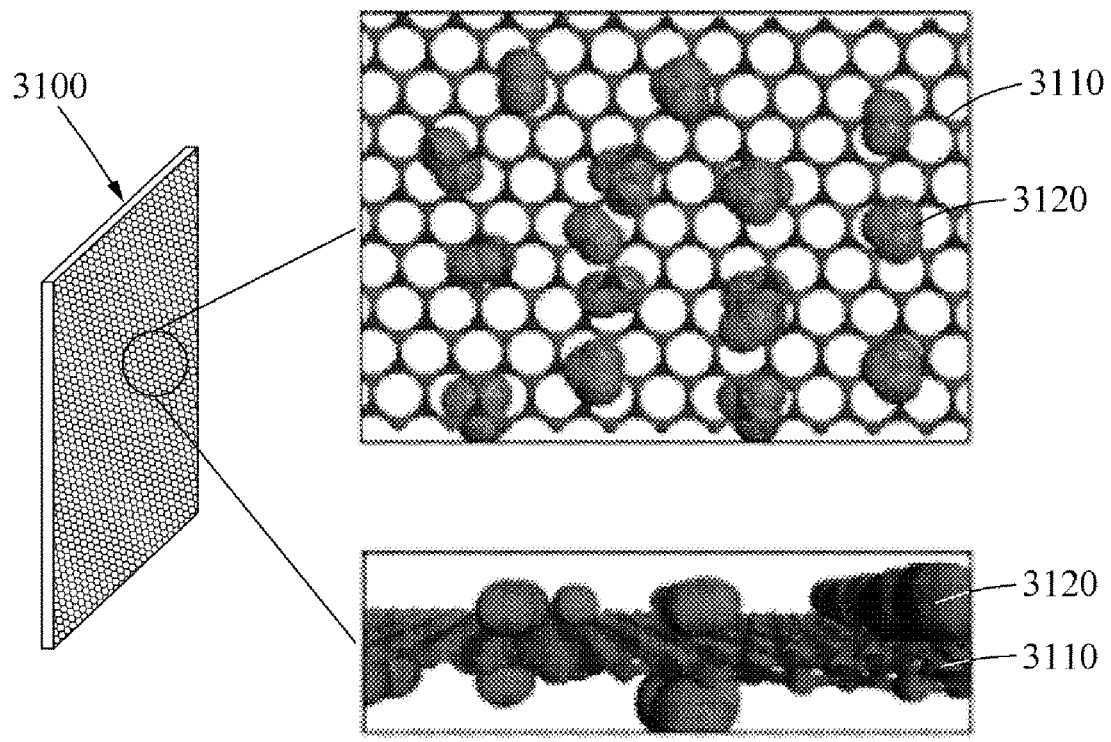
FIG. 12 is a diagram illustrating a structure of an MEA of a hexagonal boron nitride thin film in which metal catalyst particles are dispersedly formed according to an example embodiment.

FIG. 12 is a diagram illustrating a structure of an MEA of a hexagonal boron nitride thin film in which metal catalyst particles are dispersedly formed according to an example embodiment.

Referring to FIG. 12, in an MEA 3100, metal catalyst nanoparticles 3120 are dispersedly formed on a top surface and a bottom surface of a hexagonal boron nitride thin film 3110 formed with a single monatomic layer.

The MEA 3100 may include the hexagonal boron nitride thin film 3110 and the metal catalyst nanoparticles 3120 dispersedly formed on the hexagonal boron nitride thin film 3110.

According to an example embodiment, a hexagonal boron nitride thin film including metal catalyst nanoparticles dispersed on a surface of the hexagonal boron nitride thin film may be provided as a fuel cell MEA. The hexagonal boron nitride thin film including the metal catalyst nanoparticles may function as a fuel cell MEA.

According to an example embodiment, an MEA may not include at least one of an anode layer, a cathode layer and an interfacial binding layer that is formed of a separate polymer.

The MEA 3100 may be free of an organic binder.

According to an example embodiment, an MEA may not include an interfacial binding layer, and thus a chemical durability may be enhanced, a problem of a methanol crossover may be solved and an oxygen diffusion resistance may increase, to realize a fuel cell with an enhanced performance.

The metal catalyst nanoparticles 3120 may include one of platinum, ruthenium, a platinum alloy and core-shell structured platinum.

Metal catalyst nanoparticles dispersed on a hexagonal boron nitride thin film may include the same components as those of a metal catalyst included in an electrode layer of a general MEA. The metal catalyst particles may include one of platinum, ruthenium, a platinum alloy and core-shell structured platinum.

The metal catalyst nanoparticles 3120 may be dispersedly formed on the hexagonal boron nitride thin film 3110, and thus the hexagonal boron nitride thin film 3110 may perform a function of an MEA even though a separate electrode layer is not included.

The metal catalyst nanoparticles 3120 may have a size of 3 nm to 7 nm.

When the size of the metal catalyst nanoparticles 3120 is less than 3 nm, a durability of a catalyst may be reduced. When the size of the metal catalyst nanoparticles 3120 exceeds 7 nm, an activity of a catalyst may be reduced due to a low specific surface area of the catalyst.

The metal catalyst nanoparticles 3120 may be included in an amount of 0.1 milligram per square centimeter ($mg/cm^2$) to 0.2 $mg/cm^2$ per unit area of the hexagonal boron nitride thin film 3110.

The hexagonal boron nitride thin film 3110 may have a thickness of 0.3 nm to 3 nm.

In an example, a hexagonal boron nitride thin film layer may be formed as a single monatomic layer. In this example, the hexagonal boron nitride thin film layer may have a thickness of 0.3 nm. In another example, when a multi-layer hexagonal boron nitride thin film is formed and when a thickness of the multi-layer hexagonal boron nitride thin film exceeds 3 nm, a hydrogen ion transfer capability may be significantly reduced during an operation of a fuel cell. Desirably, when a hexagonal boron nitride thin film layer is formed with a thickness of 0.3 nm to 1.7 nm, the hexagonal boron nitride thin film layer may exhibit a more excellent performance as an MEA of the fuel cell.

The hexagonal boron nitride thin film 3110 may include a single exchange membrane or a plurality of exchange membranes.

According to an example embodiment, a hexagonal boron nitride thin film layer may include a single exchange membrane, or an exchange membrane assembly in which a plurality of exchange membranes are formed, as needed.

The hexagonal boron nitride thin film 3110 may include a single exchange membrane and may be a boron nitride monatomic layer.

In an example, each of exchange membranes of a hexagonal boron nitride thin film layer may be formed as a single boron nitride monatomic layer. Forming of a hexagonal boron nitride thin film layer as a single monatomic layer may be possible under specific temperature and pressure conditions and using a properly selected substrate material. According to an example embodiment, a method of preparing a hexagonal boron nitride thin film layer as a single monatomic layer in a fuel cell MEA may be provided, which will be described below. When a hexagonal boron nitride thin film layer is included in an MEA of a fuel cell, the fuel cell may be more excellent in a chemical stability and a thermal stability, because the hexagonal boron nitride thin film layer is not a polymer, for example, Nafion or a hydrocarbon-based material. Also, when the hexagonal boron nitride thin film layer is formed as a single monatomic layer, a thickness of the hexagonal boron nitride thin film layer may be reduced and a hydrogen ion transfer resistance value may decrease, and accordingly a performance of the fuel cell MEA may increase.

In another example, based on an environment to which a fuel cell is applicable, each of exchange membranes of a hexagonal boron nitride thin film layer may be formed as a multi-layer boron nitride thin film formed by laminating a plurality of monatomic layers. Forming of a hexagonal boron nitride thin film layer in a multilayer structure may also be possible under specific temperature and pressure conditions and using a properly selected substrate material. According to an example embodiment, a method of preparing a hexagonal boron nitride thin film layer with a multilayer structure in a fuel cell MEA may be provided. When a multi-layer hexagonal boron nitride thin film is formed and included in an MEA of a fuel cell, the MEA may exhibit an excellent effect of enhancing a durability by increasing a mechanical strength.

The hexagonal boron nitride thin film 3110 may be functionalized by at least one of H, O and F.

According to an example embodiment, the hexagonal boron nitride thin film layer may be functionalized to include at least one component among H, O and F that are atoms forming a hydrogen bond. The functionalized hexagonal boron nitride thin film may include at least one of a B—H bond, a B—O bond, a B—F bond and a B—$F_2$ bond. The functionalized hexagonal boron nitride thin film may have an effect of enhancing a hydrogen ion transfer capability by lowering an energy barrier for passing hydrogen ions.

According to an example embodiment, in a state in which a hexagonal boron nitride thin film is formed on a substrate, an oxygen functionalization process and a hydrogen functionalization process may be performed using an oxygen plasma and a hydrogen plasma. Also, the hexagonal boron nitride thin film formed on the substrate may be exposed to a $XeF_2$ gas, to form a fluorine-functionalized hexagonal boron nitride thin film. Thus, the hexagonal boron nitride thin film may include at least one of a B—H bond, a B—O bond, a B—F bond and a B—$F_2$ bond on a surface of the hexagonal boron nitride thin film.

The hexagonal boron nitride thin film 3110 including the dispersedly formed metal catalyst nanoparticles 3120 may function as a cathode, an anode and a thin film of a fuel cell.

According to an example embodiment, a hexagonal boron nitride thin film may have a high hydrogen ion transfer characteristic, and thus may function as a thin film that is generally fabricated with Nafion according to the related art, and metal catalyst nanoparticles dispersedly formed on the hexagonal boron nitride thin film may function as a cathode and an anode that are generally formed with a thin film sandwiched between the cathode and the anode.

The fuel cell MEA may be free of a fuel cell electrode.

According to an example embodiment, an MEA may not include a separate electrode layer, and a process of producing an electrode layer may be omitted from a fabrication process, and accordingly production costs may be significantly reduced and a volume may also be reduced. Also, since a Nafion interfacial binding layer in a cathode layer is not used, an oxygen diffusion resistance value may be greatly reduced and a performance of a fuel cell MEA may greatly increase.

In an example, a fuel cell with a hexagonal boron nitride thin film may include a bipolar plate, a collector, and at least one unit cell including a fuel cell MEA according to an example embodiment.

In another example, a fuel cell may include a fuel cell MEA with a hexagonal boron nitride thin film according to an example embodiment, and additionally include a unit cell including a collector and a bipolar plate.

Figure 13:
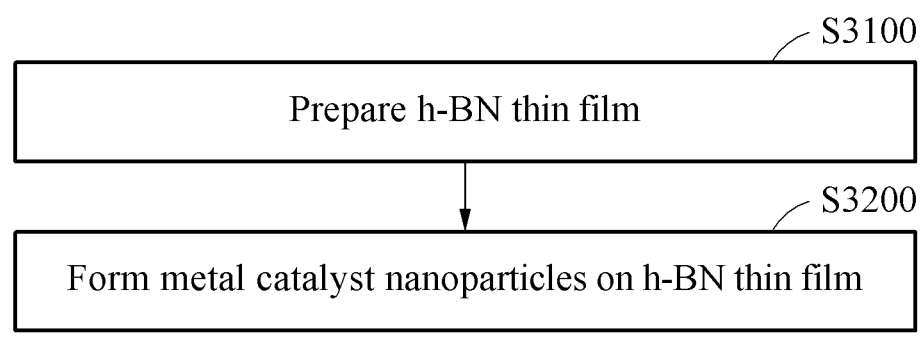
FIG. 13 is a flowchart illustrating another example of a method of fabricating a fuel cell MEA including a hexagonal boron nitride thin film according to an example embodiment.

FIG. 13 is a flowchart illustrating a method of fabricating a fuel cell MEA including a hexagonal boron nitride thin film according to an example embodiment.

Hereinafter, a method of fabricating a fuel cell MEA including a hexagonal boron nitride thin film according to an example embodiment will be described with reference to FIG. 13.

The method of FIG. 13 may include operation S3100 of preparing a hexagonal boron nitride thin film, and operation S3200 of forming metal catalyst nanoparticles on the hexagonal boron nitride thin film.

Operation S3200 may be performed using one of an electron beam deposition, a thermal deposition, sputtering and a solution coating. For example, the metal catalyst nanoparticles may be formed using various methods of dispersing the metal catalyst nanoparticles on the hexagonal boron nitride thin film. In this example, a homogeneity may be determined based on a scheme of forming metal catalyst nanoparticles, which may have an important influence on a performance of a fuel cell.

Operation S3100 may include forming the hexagonal boron nitride thin film on an auxiliary substrate, and separating the hexagonal boron nitride thin film from the auxiliary substrate.

In a method of preparing a hexagonal boron nitride thin film according to an example embodiment, the hexagonal boron nitride thin film may be provided in a structure of a single monatomic layer, or a multi-layer structure in which a plurality of monatomic layers are laminated.

A CVD process may be used to form the hexagonal boron nitride thin film on the auxiliary substrate.

Operation S3100 may include heating ammonia borane using a CVD process, and diffusing the heated ammonia borane into a furnace maintained at a high temperature using a hydrogen gas and forming a hexagonal boron nitride thin film on an auxiliary substrate that is in the furnace. The CVD process may include, for example, an LPCVD process.

The ammonia borane may be heated at a temperature of 80° C. to 130° C. The furnace may be maintained at a temperature of 800° C. to 1500° C.

The auxiliary substrate may include platinum, and the CVD process may be performed at a temperature of 800° C. to 1100° C. and a pressure of 0.1 Torr to 0.15 Torr.

For example, a material of the auxiliary substrate may include platinum and the CVD process may be performed under the above temperature and pressure conditions, to form a hexagonal boron nitride thin film with a single homogeneous monatomic layer.

The auxiliary substrate may include sapphire, and the CVD process may be performed at a temperature of 1400° C. to 1500° C. and a pressure of 0.1 Torr to 0.15 Torr. Thus, the hexagonal boron nitride thin film may be formed with multiple layers. For example, a material of the auxiliary substrate may include sapphire and the CVD process may be performed under the temperature and pressure conditions, to form a homogeneous multi-layer hexagonal boron nitride thin film.

Since a platinum substrate or a sapphire substrate is expensive and chemically inert, recycling is very important. Using the methods according to an example embodiment, a hexagonal boron nitride thin film formed on a platinum substrate or a sapphire substrate may be successfully transferred to an arbitrary substrate, and thus the platinum substrate or the sapphire substrate may be recycled.

Also, the auxiliary substrate may be formed of platinum or sapphire, which is one of significant features in a method of fabricating a fuel cell MEA in the present disclosure. For example, when a nickel foil or a copper foil is used to form the auxiliary substrate, it is impossible to form a hexagonal boron nitride thin film with a single homogeneous monatomic layer or to form a homogeneous multi-layer hexagonal boron nitride thin film, as intended in the present disclosure.

The temperature and pressure conditions for the CVD process are also one of the significant features in the method. When the temperature and the pressure are out of the above ranges, a hexagonal boron nitride thin film with a single homogeneous monatomic layer, or a homogeneous multi-layer hexagonal boron nitride thin film may not be obtained, or a monatomic layer with a uniform shape may not be formed.

The separating of the hexagonal boron nitride thin film from the auxiliary substrate may include laminating a supporter including one of PMMA, polyvinyl alcohol and polystyrene on the hexagonal boron nitride thin film formed on the auxiliary substrate, separating the supporter and the hexagonal boron nitride thin film from the auxiliary substrate, and removing the supporter from the hexagonal boron nitride thin film using an organic solvent to obtain the hexagonal boron nitride thin film.

The supporter and the hexagonal boron nitride thin film may be separated from the auxiliary substrate, using an aluminum etchant or hydrogen gas bubbles generated by an electrolysis.

For example, a process of using hydrogen gas bubbles generated by the electrolysis may include mounting the auxiliary substrate, the hexagonal boron nitride thin film and the supporter formed on the hexagonal boron nitride thin film in one electrode portion of an electrolysis apparatus in a solvent environment including NaOH, performing the electrolysis, and forming a hydrogen gas.

The aluminum etchant may include at least one of HF, $HNO_3$ and $H_3PO_4$. To separate the supporter and the hexagonal boron nitride thin film from the auxiliary substrate using the aluminum etchant, a method of floating h-BN grown on a sapphire substrate on an aluminum etchant and separating the sapphire substrate and the h-BN may be used.

Example 1

<Hydrogen Ion Transport Experiment of Hexagonal Boron Nitride Thin Film>

To verify a hydrogen ion transfer characteristic of a hexagonal boron nitride thin film and an applicability of the hexagonal boron nitride thin film to a fuel cell, a multi-layer hexagonal boron nitride thin film layer in which three hexagonal boron nitride monatomic layers are laminated was prepared using the methods according to an example embodiment. Nafion electrolyte membranes were formed on or below the hexagonal boron nitride thin film layer and each have a thickness of 50 μm, and a direct methanol fuel cell (DMFC) MEA model that has a sandwich structure of the Nafion electrolyte membrane, the hexagonal boron nitride thin film layer and the Nafion electrolyte membrane was fabricated and a performance was evaluated.

As a comparative example, a DMFC MEA model was fabricated and a performance was evaluated in the same manner as in Example 1 except that a hexagonal boron nitride thin film layer according to an example embodiment was not included. The DMFC MEA model of the comparative example was fabricated with a Nafion electrolyte membrane having a thickness of 100 μm.

Figure 6A:
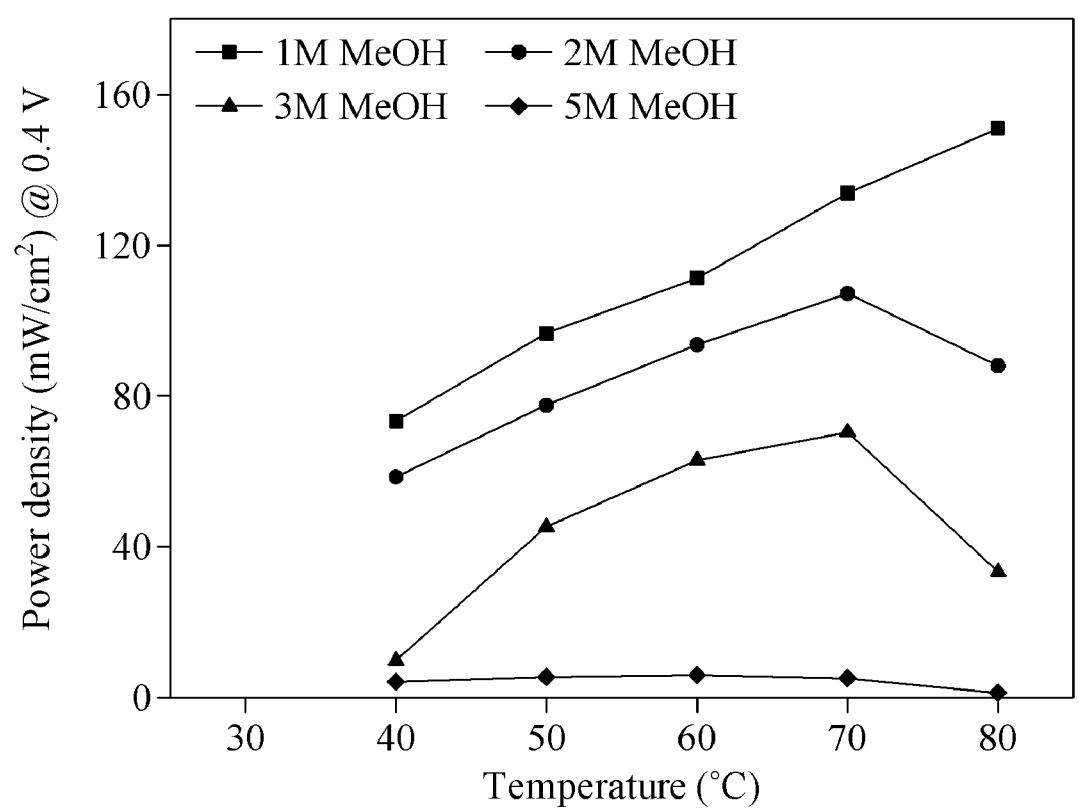
FIG. 6A is a graph illustrating a power density measured based on a temperature in a direct methanol fuel cell (DMFC) MEA model of Example 1 that includes a three-layer hexagonal boron nitride thin film between Nafion electrolyte membranes, each having a thickness of 50 μm according to an example embodiment.

FIG. 6A is a graph illustrating a power density measured based on a temperature in the DMFC MEA model of Example 1 that includes a three-layer hexagonal boron nitride thin film formed between Nafion electrolyte membranes, each having a thickness of 50 μm.

Figure 6B:
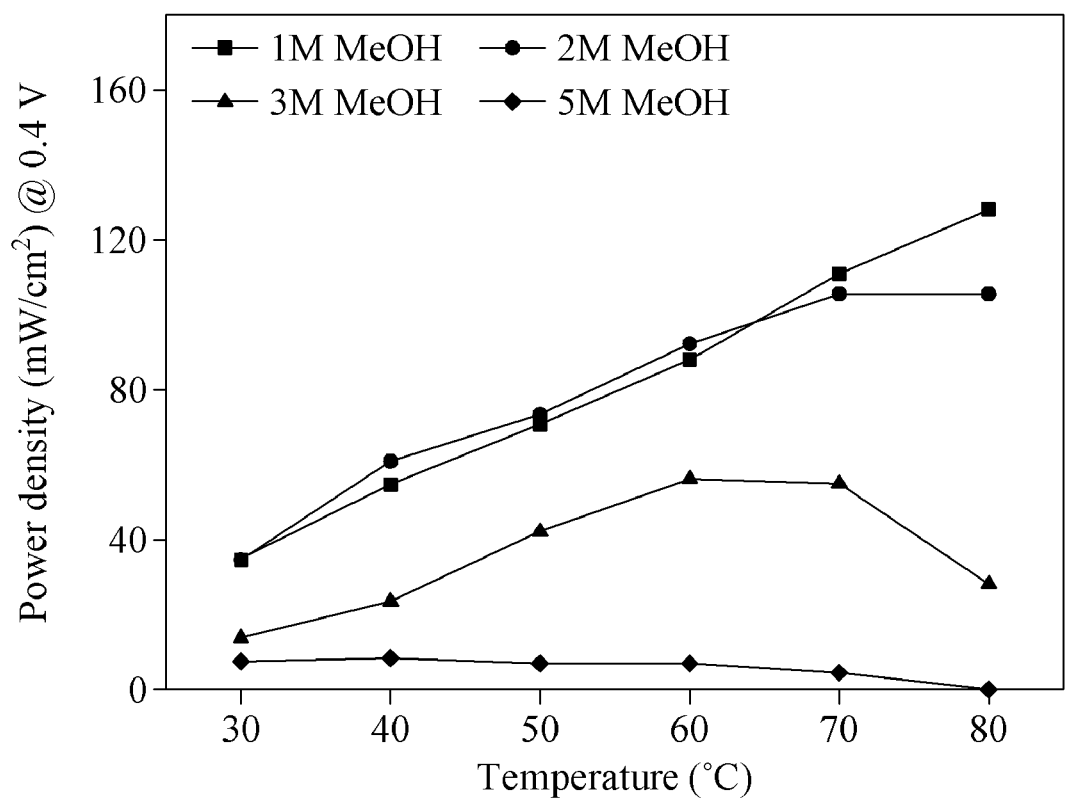
FIG. 6B is a graph illustrating a power density measured based on a temperature in a DMFC MEA model of a comparative example that does not include a hexagonal boron nitride thin film between Nafion electrolyte membranes according to an example embodiment.

FIG. 6B is a graph illustrating a power density measured based on a temperature in the DMFC MEA model of the comparative example that does not include a hexagonal boron nitride thin film between Nafion electrolyte membranes.

Power densities and peak measurement values of samples fabricated in Example 1 and the comparative example are shown in Table 1.

TABLE 1

| | | | Peak Power Density (mW/cm$^2$) @ 60° C. | | | |
|---|---|---|---|---|---|---|
| | | | 1M MeOH | 2M MeOH | 3M MeOH | 5M MeOH |
| Comparative example | Nafion 212 × 2ea (100 μm) | 0.4 V Max. | 87.9 101.6 (0.30 V) | 92.32 113.9 (0.28 V) | 56.3 77.1 (0.28 V) | 7.4 23.1 (0.17 V) |
| Example 1 | 3-direct grown h-BN (100 μm) | 0.4 V Max. | 111.5 118.1 (0.36 V) | 93.9 122.4 (0.29 V) | 62.9 104.9 (0.257 V) | 5.9 46.6 (0.17 V) |

By comparing the graphs of FIGS. 6A and 6B and data of Table 1, it may be found that the DMFC MEA model including the hexagonal boron nitride thin film exhibits an excellent performance in most of temperatures in comparison to the DMFC MEA model that does not include a hexagonal boron nitride thin film. Also, through the above experiment, it may be found that when an MEA including a hexagonal boron nitride thin film is fabricated, the hexagonal boron nitride thin film has an effect of reducing a high methanol crossover that has been recognized as a problem of a Nafion electrolyte membrane in the related art. Furthermore, through the above experiment, it may be found that the hexagonal boron nitride thin film has an excellent hydrogen ion transfer characteristic and that an MEA of a fuel cell may be fabricated based on the excellent hydrogen ion transfer characteristic.

Example 2

<Experiment of Applying Hexagonal Boron Nitride Thin Film to Proton-Exchange Membrane Fuel Cell (PEMFC) MEA>

To verify an enhancement in a performance of a fuel cell to which a single-layer hexagonal boron nitride thin film according to an example embodiment is applied, a hexagonal boron nitride thin film layer as a single monatomic layer was prepared on a platinum substrate using the method according to an example embodiment, and was separated from the platinum substrate. Using the separated hexagonal boron nitride thin film layer, a PEMFC MEA model with a structure in which an anode layer, a hexagonal boron nitride thin film layer, a Nafion binder layer and a cathode layer are formed, was fabricated.

Figure 7:
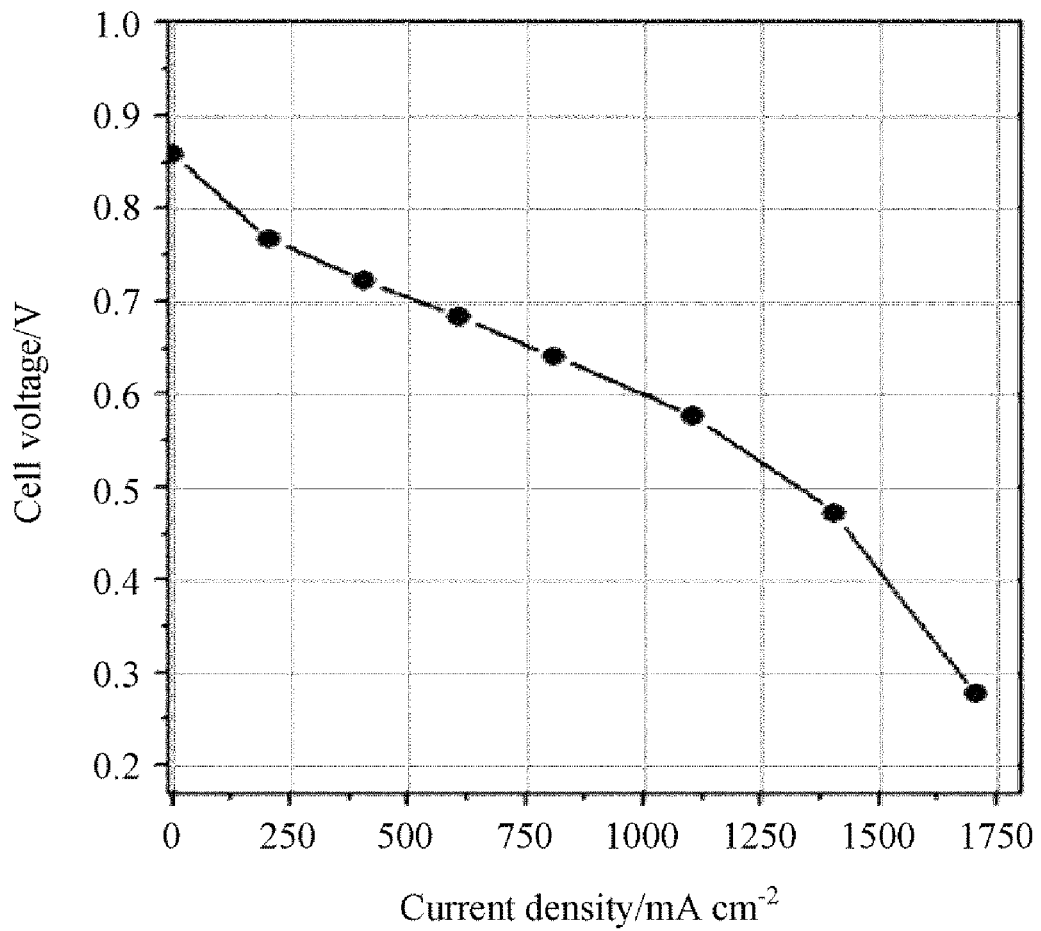
FIG. 7 is a graph illustrating a cell voltage measured based on a current density in a proton-exchange membrane fuel cell (PEMFC) MEA model including a single-layer hexagonal boron nitride thin film according to an example embodiment.

FIG. 7 is a graph illustrating a cell voltage measured based on a current density in a PEMFC MEA model including a single-layer hexagonal boron nitride thin film according to an example embodiment.

Figure 8:
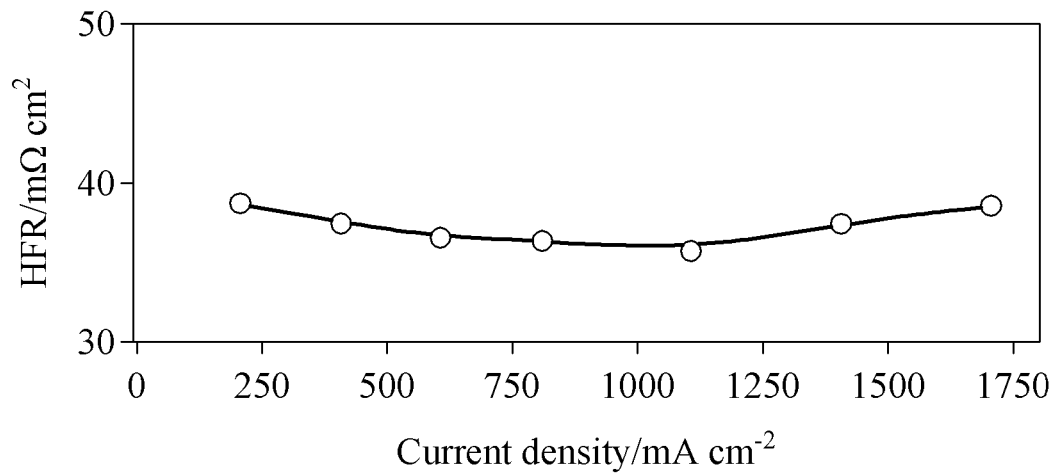
FIG. 8 is a graph illustrating a high frequency resistance (HFR) value measured based on a current density in a PEMFC MEA model including a single-layer hexagonal boron nitride thin film according to an example embodiment.

FIG. 8 is a graph illustrating a high frequency resistance (HFR) value measured based on a current density in a PEMFC MEA model including a single-layer hexagonal boron nitride thin film according to an example embodiment.

Through the above experiment, it is found that an operating result of a fuel cell MEA including a hexagonal boron nitride thin film layer according to an example embodiment was excellent.

Example 3

<Functionalization Experiment of Hexagonal Boron Nitride Thin Film>

Monatomic single-layer hexagonal boron nitride thin films were exposed to an oxygen plasma, a hydrogen plasma and a XeF$_2$ gas, to obtain an oxygen-functionalized hexagonal boron nitride thin film sample (Example 3-1), a hydrogen-functionalized hexagonal boron nitride thin film sample (Example 3-2) and a fluorine-functionalized hexagonal boron nitride thin film sample (Example 3-3).

For the obtained samples of Examples 3-1 through 3-3, whether the hexagonal boron nitride thin films are functionalized was determined using an X-ray photoelectron spectroscopy (XPS).

Figures 11A, 11B, 11C:
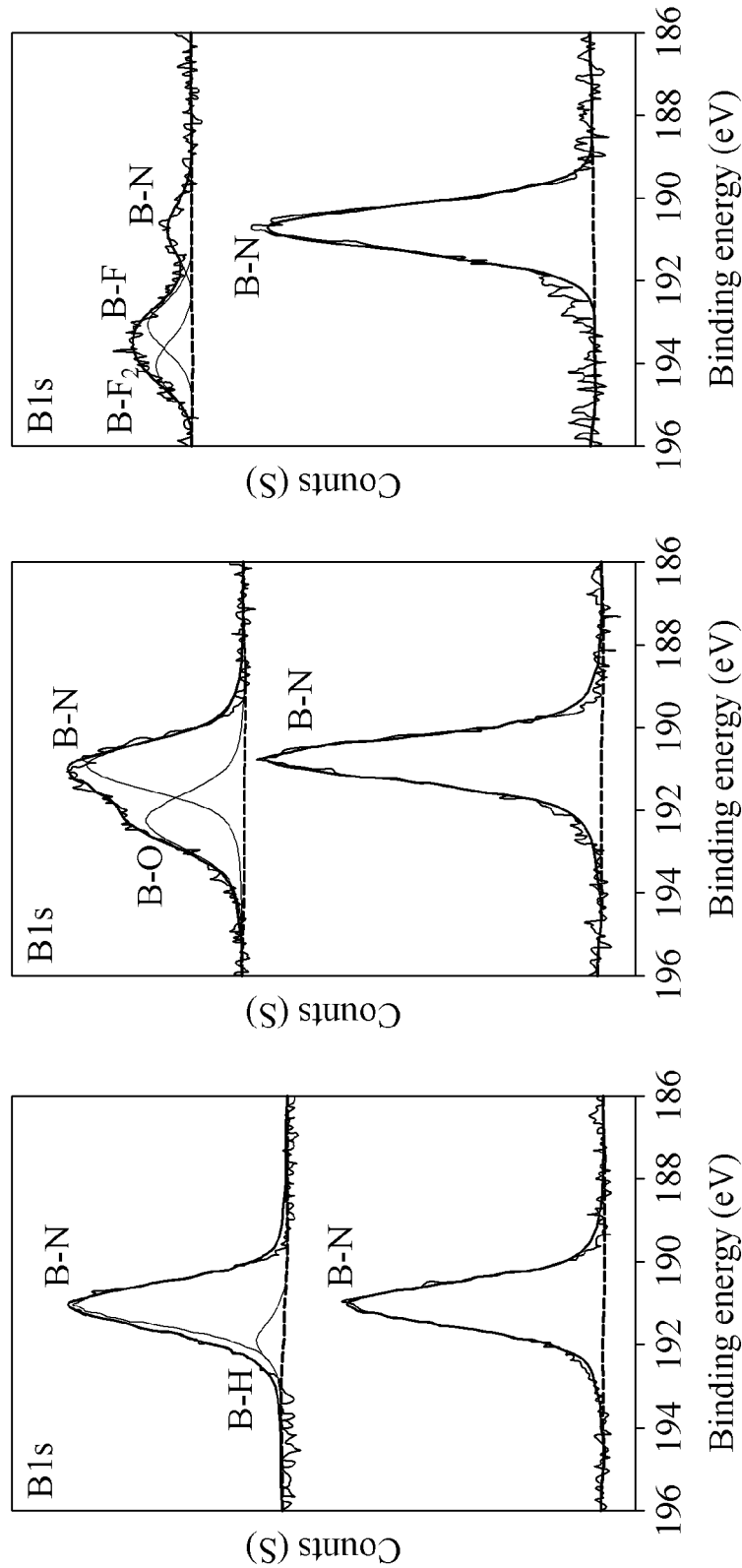
FIGS. 11A through 11C are graphs illustrating experimental results of an X-ray photoelectron spectroscopy (XPS) for functionalized hexagonal boron nitride thin films.

FIGS. 11A through 11C are graphs illustrating XPS experimental results for functionalized hexagonal boron nitride thin films. In XPS measurements, a binding energy of a peak corresponding to a B—N bond is 191.01 eV, a binding energy of a peak corresponding to a B—H bond is 191.80 eV, a binding energy of a peak corresponding to a B—O bond is 192.23 eV, a binding energy of a peak corresponding to a B—F bond is 193.03 eV, and a binding energy of a peak corresponding to a B—F$_2$ bond is 194.08 eV. Through the graphs, a type of bonds formed in each of the samples was determined.

FIG. 11A is a graph illustrating an XPS experimental result for the hydrogen-functionalized hexagonal boron nitride thin film (Example 3-1), FIG. 11B is a graph illustrating an XPS experimental result for the oxygen-functionalized hexagonal boron nitride thin film (Example 3-2), and FIG. 11C is a graph illustrating an XPS experimental result for the fluorine-functionalized hexagonal boron nitride thin film (Example 3-3).

It may be found that a hydrogen-functionalized B—H bond, an oxygen-functionalized B—O bond, and a fluorine-functionalized B—F bond and a fluorine-functionalized B—F$_2$ bond were formed, in addition to a B—N bond forming boron nitride, as intended, in each of the samples.

According to example embodiments, a high-performance hexagonal boron nitride thin film capable of covering a large area of a substrate may be synthesized with a single layer or a plurality of layers, and a hexagonal boron nitride layer formed on the substrate may be moved to another substrate using an electrochemical bubbling method. Thus, it is possible to reuse the substrate.

Also, according to example embodiments, a synthesized hexagonal boron nitride thin film may be used in an MEA of a fuel cell, and thus it is possible to fabricate a fuel cell that has a higher performance than a performance of a fuel cell including a Nafion film according to a related art and that has a low methanol crossover.

Furthermore, according to example embodiments, an MEA does not include a Nafion interfacial binding layer, and thus it is possible to expect an effect of solving an oxygen diffusion resistance problem that occurs due to a Nafion polymer layer in the related art.

In addition, according to example embodiments, a new fuel cell MEA may include metal catalyst particles that are dispersed on a hexagonal boron nitride thin film, and thus the hexagonal boron nitride thin film may function as both an electrode and a thin film of a fuel cell.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A fuel cell membrane electrode assembly (MEA) with a hexagonal boron nitride film as an exchange membrane, the fuel cell MEA, comprising:
    an anode layer;
    at least one exchange membrane that is disposed on the anode layer as either a single-layered structure including one exchange membrane or a multi-layered structure including a plurality of exchange membranes, each exchange membrane of the at least one exchange membrane consisting of a film comprising hexagonal boron nitride, and the at least one exchange membrane having a total thickness ranging from 0.3 to 3 nm;
    an interfacial binding layer that is formed to completely cover an exposed surface of one exchange membrane which is obverse to the anode layer, and that consists of poly(methylmethacrylate) (PMMA) as a binder material; and
    a cathode layer formed on the interfacial binding layer.

2. The fuel cell MEA of claim 1, wherein the total thickness of the at least one exchange membrane ranges from 0.3 to 1.7 nm.

3. The fuel cell MEA of claim 1, wherein the at least one exchange membrane has the single-layered structure and consists of a single film that comprises a monatomic layer of hexagonal boron nitride.

4. The fuel cell MEA of claim 1, wherein the film comprising hexagonal boron nitride is functionalized by H, O, F, or combinations thereof.

5. The fuel cell MEA according to claim 1, wherein the at least one exchange membrane has the multi-layered structure and consists of a plurality of films that are laminated to one another, each film of the plurality of films consisting of a monatomic layer of hexagonal boron nitride.

6. The fuel cell MEA of claim 5, wherein the total thickness of the at least one exchange membrane ranges from 0.3 to 1.7 nm.

7. The fuel cell MEA of claim 1, wherein the interfacial binding layer has a thickness ranging from 2 to 50 μm.

8. The fuel cell MEA of claim 5, wherein the interfacial binding layer has a thickness ranging from 2 to 50 μm.

* * * * *